(12) United States Patent
Balasubramanian et al.

(10) Patent No.: US 12,126,604 B2
(45) Date of Patent: *Oct. 22, 2024

(54) CROSS-REGIONAL REPLICATION OF KEYS

(71) Applicant: Oracle International Corporation, Redwood Shores, CA (US)

(72) Inventors: Suryanarayanan Balasubramanian, Redmond, WA (US); Augustine Varun Mathew, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,790

(22) Filed: Sep. 22, 2023

(65) Prior Publication Data

US 2024/0015143 A1 Jan. 11, 2024

Related U.S. Application Data

(63) Continuation of application No. 17/687,124, filed on Mar. 4, 2022, now Pat. No. 11,799,839.
(Continued)

(51) Int. Cl.
*H04L 9/40* (2022.01)
*H04L 9/08* (2006.01)
*H04W 12/06* (2021.01)

(52) U.S. Cl.
CPC .......... *H04L 63/062* (2013.01); *H04L 9/0877* (2013.01); *H04L 9/0891* (2013.01);
(Continued)

(58) Field of Classification Search
CPC ... H04L 63/062; H04L 9/0877; H04L 9/0891; H04L 9/0894; H04L 63/0209; H04W 12/068
See application file for complete search history.

(56) References Cited

U.S. PATENT DOCUMENTS 9,582,524 B1 * 2/2017 Murali ................. G06F 16/214
10,846,302 B1 * 11/2020 Edukulla ................ G06F 16/27
(Continued)

OTHER PUBLICATIONS

Ongaro, et al., In Search of an Understandable Consensus Algorithm (extended version), published by Stanford University, May 20, 2014, 18 pages.

*Primary Examiner* — Cheng-Feng Huang
(74) *Attorney, Agent, or Firm* — Invoke

(57) ABSTRACT

Discussed herein is a technique for replication of keys across regions of a cloud infrastructure. A first vault is created in a first region. The first vault stores a plurality of records, each of which is associated with a key and corresponding metadata. A second region, different from the first region, is selected where replication of the plurality of records is desired. A second vault is created in the second region. The plurality of records are relayed from the first vault to the second vault, so that each of the plurality of records is replicated in the second vault based on an entropy value of the record. A mutation operation executed with respect to the first vault is stored as a new record in the first vault. The new record is transmitted to the second vault, which is updated to reflect the mutation operation performed on the first vault.

34 Claims, 12 Drawing Sheets

Related U.S. Application Data

(60) Provisional application No. 63/167,560, filed on Mar. 29, 2021.

(52) U.S. Cl.
CPC ........ *H04L 9/0894* (2013.01); *H04L 63/0209* (2013.01); *H04W 12/068* (2021.01)

(56) References Cited

U.S. PATENT DOCUMENTS

| | | | | |
|---|---|---|---|---|
| 2012/0041933 A1* | 2/2012 | Driesen | ................. | G06F 16/214 |
| | | | | 707/E17.005 |
| 2018/0343239 A1* | 11/2018 | Vaswani | ............. | H04L 63/0815 |
| 2019/0354710 A1* | 11/2019 | Leshinsky | ............. | H04L 9/0861 |
| 2020/0243205 A1* | 7/2020 | Sharma | ................. | G06F 16/137 |
| 2021/0182190 A1* | 6/2021 | Gao | .................... | G06F 12/0246 |

* cited by examiner

CROSS-REGIONAL REPLICATION OF KEYS

CROSS-REFERENCES TO RELATED APPLICATIONS

Each of the following applications are hereby incorporated by reference: application Ser. No. 17/687,124 filed on Mar. 4, 2022; application No. 63/167,560 filed on Mar. 29, 2021. The Applicant hereby rescinds any disclaimer of claim scope in the parent application(s) or the prosecution history thereof and advises the USPTO that the claims in this application may be broader than any claim in the parent application(s).

FIELD

The present disclosure relates to a framework for replicating keys across regions of a realm of a cloud infrastructure.

BACKGROUND

In a cloud infrastructure, management of keys associated with users pertains to the generation, exchange, and storage of the keys. Typically, the keys generated for a user are stored in a primary host machine and replicated to other host machines i.e., secondary host machines, for backup purposes. However, the primary host machine and the secondary host machine(s) typically belong to a same region of the cloud infrastructure. In such a setting, if the region fails e.g., host machines in the region are inoperable due to failure events, users risk losing their data encrypted with the keys. Moreover, typical cloud infrastructures do not provide users any flexibility with respect to the management of their keys.

Embodiments described herein address these and other problems, individually and collectively.

SUMMARY

The present disclosure relates generally to a framework for replicating keys across regions of a realm of a cloud infrastructure. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure provides for a method comprising: creating, by a computing device, a first vault in a first region of a cloud infrastructure, the first vault storing a plurality of records, each record being associated with a key and metadata associated with the key; selecting, by the computing device, a second region within the cloud infrastructure where replication of the plurality of records is desired, the second region being different from the first region; creating, by the computing device, a second vault in the second region of the cloud infrastructure; relaying, by the computing device, the plurality of records from the first vault to the second vault, the relaying causing each of the plurality of records to be replicated in the second vault based on an entropy value of the record; executing, by the computing device, a mutation operation with respect to the first vault, the mutation operation being stored as a new record in the first vault; transmitting, by the computing device, the new record to the second vault in the second region of the cloud infrastructure; and updating, by the computing device, the second vault to reflect the mutation operation performed on the first vault by storing the new record in the second vault based on the entropy value of the new record.

Another aspect of the present disclosure provides for a non-transitory computer readable medium storing specific computer-executable instructions that, when executed by a processor, cause a computer system to at least: create a first vault in a first region of a cloud infrastructure, the first vault storing a plurality of records, each record being associated with a key and metadata associated with the key; select a second region within the cloud infrastructure where replication of the plurality of records is desired, the second region being different from the first region; create a second vault in the second region of the cloud infrastructure; relay the plurality of records from the first vault to the second vault, the relaying causing each of the plurality of records to be replicated in the second vault based on an entropy value of the record; execute a mutation operation with respect to the first vault, the mutation operation being stored as a new record in the first vault; transmit the new record to the second vault in the second region of the cloud infrastructure; and update the second vault to reflect the mutation operation performed on the first vault by storing the new record in the second vault based on the entropy value of the new record.

One aspect of the present disclosure provides for a computing device comprising: a processor; and a memory including instructions that, when executed with the processor, cause the computing device to, at least: create a first vault in a first region of a cloud infrastructure, the first vault storing a plurality of records, each record being associated with a key and metadata associated with the key; select a second region within the cloud infrastructure where replication of the plurality of records is desired, the second region being different from the first region; create a second vault in the second region of the cloud infrastructure; relay the plurality of records from the first vault to the second vault, the relaying causing each of the plurality of records to be replicated in the second vault based on an entropy value of the record; execute a mutation operation with respect to the first vault, the mutation operation being stored as a new record in the first vault; transmit the new record to the second vault in the second region of the cloud infrastructure; and update the second vault to reflect the mutation operation performed on the first vault by storing the new record in the second vault based on the entropy value of the new record.

The foregoing, together with other features and embodiments will become more apparent upon referring to the following specification, claims, and accompanying drawings.

DETAILED DESCRIPTION

Figure 1:
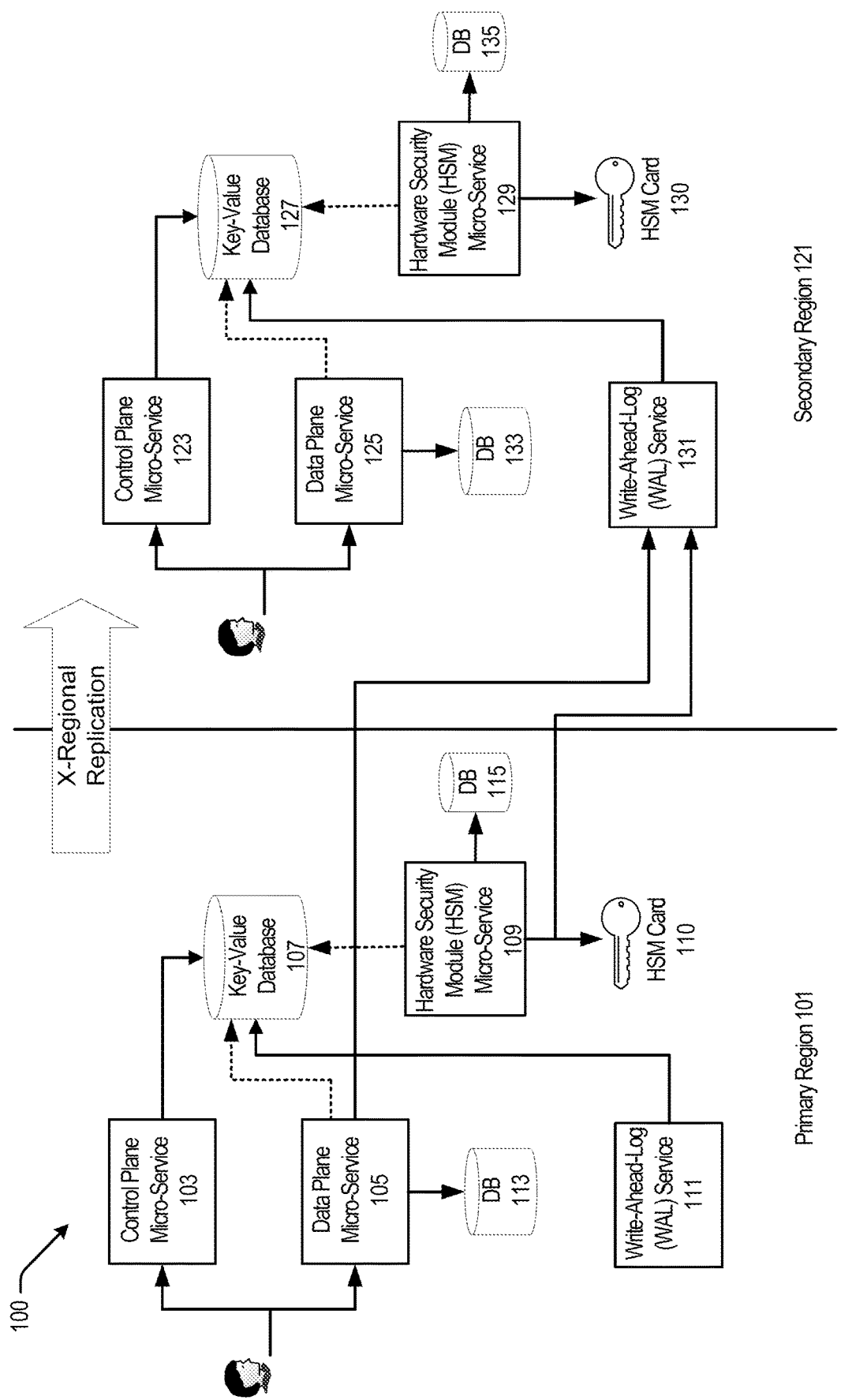
FIG. 1 depicts an exemplary architecture for cross-regional replication of keys in a cloud environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Key management service (KMS) is a service provided by a cloud infrastructure service provider for the efficient management and processing of customer information e.g., customer keys that are used to encrypt customer sensitive data. A cloud infrastructure is hosted in regions and availability domains. A region is a localized geographic area, and an availability domain is one or more data centers located within a region. A region is composed of one or more availability domains. A collection of non-overlapping regions forms a realm of the cloud infrastructure. Customers use keys generated by KMS either directly for their application's cryptographic needs and/or indirectly through other services (e.g., object store, block storage, etc.) offered by the service provider.

Typically, when a customer issues a request to generate a key, KMS generates the key and stores copies of the key in a predetermined number of host machines that all reside within a particular region. Thereafter, a customer's request to use the key is served by one of the host machines within the region. In such a setting, if KMS fails in a region (e.g., due to host machines in the region being inoperable due to certain faults), customers risk losing their data that is encrypted with the key(s). In an alternative implementation, region pairs are assigned in a predetermined manner to each user. Specifically, each user is allocated a primary region and a backup region (i.e., a region where the user may replicate their information). It is noted that the allocation of the primary and backup regions is fixed and the customers have no flexibility to dynamically select a secondary region (i.e., a region of their choice) within the realm. Thus, it is desired to have a framework that enables customers to dynamically select secondary regions for data replication (i.e., ensuring no data loss) while seamlessly continuing to utilize the services of the cloud infrastructure.

According to some embodiments, there is provided a KMS that is a composition of three services that are distributed and fault tolerant in nature. KMS provides for cross-regional replication of keys within the realm, where the secondary regions for data replication are selected by the customer/user. Specifically, customer keys stored in a primary region are replicated (i.e., copied and stored) to one or more secondary regions within the realm. It is noted that the regions within the realm may be mutually exclusive i.e., non-overlapping regions. The composition of three services of the KMS include: (1) a KMS service: responsible for all user facing control plane and data plane operations, (2) a Hardware Security Module (HSM) service: responsible for HSM related operations and replicating HSM keys between hardware devices, and (3) a Cluster Management service: responsible for cluster membership and service monitoring. The Cluster Management service monitors service health and determines whether a service should serve traffic based on replication progress.

By some embodiments, the KMS Service and HSM Service are replicated state machines (RSM) that employ state machine replication to reliably replicate data. Some of these services may have several processes on the host machine (i.e., a node) backing it. The KMS Service has two independent processes: a control plane process and a data plane process, which are referred to herein as a control plane micro-service and a data plane micro-service, respectively. The HSM service constitutes a single service referred to herein as an HSM micro-service. These micro-services are described later in detail with reference to FIG. 1.

By some embodiments, the replication of keys is performed on a customer vault basis. A vault is defined herein as a customer facing abstraction (e.g., a container) that holds a plurality of keys (and metadata related to the keys) associated with the customer. The vault is managed by at least the three micro-services stated above i.e., the control plane micro-service, the data plane micro-service, and the HSM micro-service. Cross-regional replication of keys enables customers to replicate their keys from one region to another region and be resilient to at least single region disaster scenarios. The KMS of the present disclosure provides for customers to mark their vault for replication by selecting an arbitrary region in a realm. Thereafter, all the existing and future keys (along with metadata such as tags) in the customer's vault (i.e., a primary vault in a primary region) are automatically replicated to a secondary vault in the selected secondary region. It is appreciated that the replication of customer information is in no way limited to being replicated to a single secondary region. Rather, the customer may select a plurality of secondary regions, where information from a primary region is replicated to each of the secondary regions.

By some embodiments, the secondary vault is configured to operate as a read only vault i.e., customers are restricted/prohibited from performing any write operations on the secondary vault. Furthermore, customers are prohibited from performing mutation operations on the keys stored in the secondary vault of the secondary region. Mutation operations may be of types: changing a key, rotating a key, modifying a tag associated with the key, modifying a display name of the vault, etc. It is appreciated that write operations and mutation operations are permitted to be performed on keys stored in the primary vault (i.e., in the primary region). As will be described later, the modified keys (and metadata) are replicated to the secondary vault. It is appreciated that the secondary vaults support read and cryptographic operations. In the above embodiments, the replication is performed in a uni-directional manner i.e., from the primary region to the secondary region. Further, a status of the replication process can be provided to customers through an API for replication guarantees. By some embodiments, in addition to supporting read and cryptographic operations on the second vault, a user/customer is permitted to perform write operations as well as mutation operations on the secondary vaults. In one implementation, this is achieved by proxying any write/mutation API calls arriving at the secondary vault over to the primary vault. Thus, from the prospective of the customer, it appears that both primary and secondary vaults allow write and/or mutation operations. In the case of a user having more than one secondary vault, it is noted that even though the secondary vault allows write and/or mutation operations, the primary vault is still responsible for replicating such operations to the other secondary vaults of the customer.

As stated above, a primary vault (e.g., in a primary region) can be associated with one or more secondary vaults in different secondary regions of the realm in a cloud infrastructure. In addition to addressing the single (and multiple) region disaster scenarios, the KMS of cross-regional replication of keys integrates seamlessly with other services provided in the cloud infrastructure. For instance, a database management service typically permits customers to have a primary database and a plurality of stand-by databases in different regions. In such a setting, the KMS provisions for keys of a customer to be available across different databases to support database failover scenarios.

FIG. 1 depicts an exemplary architecture for cross-regional replication of keys in a cloud environment in accordance with various embodiments. The architecture 100 includes a customer vault created in a primary region 101 and information therein being replicated to another vault in a secondary region 121. As stated previously, the customer vault in the primary region 101 is managed by a group of micro-services designed to serve customer requests. The micro-services include a control plane micro-service 103, a data plane micro-service 105, and a hardware security module (HMS) micro-service 109. It is appreciated that a similar set of micro-services i.e., control plane micro-service 123, data plane micro-service 125, and HSM micro-service 129 exists in the secondary region 121 and manage a secondary vault of the customer.

The control plane micro-service 103 pertains to servicing user requests related to performing mutation operations and metadata operations. For example, requests such as change a key, modify a tag associated with a key, modify a display name of the vault, rotate a key to obtain a new version of the key etc., are directed to the control plane micro-service 103. The metadata associated with the keys is stored in a backend database e.g., key-value database 107, whereas the actual keys are stored in a secure HSM card 110.

User requests pertaining to cryptographic operations are directed to the data plane micro-service 105. Specifically, a user may have one or more keys stored in the HSM card 110. The user may desire to use the keys to perform a cryptographic operation (e.g., encryption/decryption) on some data. Such user requests pertaining to executing cryptographic operations are directed to the data plane micro-service 103. The HSM micro-service 109 is a service that deals with actually executing the cryptographic operations, and performing management operations. For example, when the control plane micro-service 103 receives a request from the user to rotate a key, the HSM micro-service 109 interacts with the HSM card 110 to obtain the key and perform the key rotation operation. Similarly, when the data plane micro-service 105 receives a request to encrypt data using a specific key, the HSM micro-service 109 interacts with the HSM card 110 to obtain the specific key stored therein and further executes the encryption operation in order to provide the user with a cipher i.e., encrypted data.

As stated above, metadata associated with keys can be maintained/stored in the key-value database 107 i.e., a backend database of the cloud infrastructure. The goal of maintaining data in the key-value database 107 is that it provides a highly available fault tolerant data store. However, note that the key-value database 107 incurs a low throughput in terms of read and write operations. In order to circumvent the key-value database 107, for high throughput applications, data from the key-value database 107 database is mirrored (i.e., copied) locally to databases (DB) associated with the data plane micro-service (i.e., DB 113) and HSM micro-service (i.e., DB 115). The process of replicating data from the key-value database 107 to the local on-disk storages i.e., DB 113 and DB 115 is referred to herein as in-region replication. Details pertaining to in-region replication are described next with reference to FIG. 2.

According to one embodiment, data is stored in the key-value database 107 in the form of key-value tables. A key-value table is a data storage abstraction that includes records as key value pairs. It is noted that there are no two distinct records having the same key. Thus, one can identify updates to the key-value table as a stream of logical records that deal with create/update/delete operation(s) of a specific row identified by an identifier (ID). The goal of the key-value table replication to the local databases (i.e., DB 113 and DB 115) is to ensure that at least a subset of the key-value tables are available locally to each DB, so that requests for obtaining information are not necessarily directed to the key-value database 107.

By some embodiments, information in a vault of a customer (i.e., information maintained in a primary region) is replicated to a vault in a secondary region. Cross-regional replication of information is performed via a write-ahead log (WAL) service e.g., WAL service 111 included in region 101. The WAL service 111 maintains a write-ahead log that is a database object (e.g., a table or a ledger) that maintains an ordered sequence of operations performed by a user on information stored in the vault of the primary region 101. For cross-regional replication, the WAL service 111 in the primary region 101 obtains data from the write-ahead log and relays the obtained data (for replication purposes) to a corresponding WAL service in the secondary region e.g., WAL service 131. For example, as shown in FIG. 1, information from the data plane micro-service 105 and the HSM micro-service 109 may be maintained in a write-ahead log by the WAL service 111 and relayed to the corresponding WAL service 131 in the secondary region for replication purposes.

It is appreciated that the WAL service 111 is a service that exposes a WAL interface, so that WAL replicators (described later with reference to FIG. 3A) from other regions can write to and read about secondary WALs. A WAL service component in the secondary region (e.g., WAL service 131) obtains the WALs from the WAL service component in the primary region (e.g., WAL service 111) and writes the obtained WALs in the key-value database included in the secondary region (e.g., key-value database 127). The HSM micro-service in the secondary region (e.g., HSM micro-service 129) polls the key-value database 127 to read the WALs stored therein and further writes the WALs to the HSM card included in the secondary region e.g., HSM card 130. Thus, operations performed by users in the primary region e.g., control plane operations and data plane operations can be executed by users via control/data plane microservices of the secondary region via using the replicated information.

By some embodiments, operations performed by a user on data/information included in the vault are maintained as a series of records in a write-ahead log by the WAL service 111. While relaying information from the primary region to a secondary region, the replication of records is performed in order i.e., out-of-order delivery/replication of records is avoided by the replication system. By one embodiment, out-of-order replication of records is prevented via the use of an entropy check value associated with each record. Via the use of entropy check values, it is assured that the information is relayed in an accurate manner to the secondary region. Details pertaining to secure transmission of WAL records are described later with reference to FIG. 6. Thus, a user can instantiate a vault in a primary region of the cloud infrastructure, and select a secondary region where the information from the primary region is to be replicated. Upon creating a vault in the secondary region, each operation executed by the user in the primary region is mirrored in a dynamic manner (i.e., automatically) in the secondary region.

Described below are a few examples of use cases of vault creation and information replication:
- A. Alice has a Vault V1 in region 1 (e.g., us-ashburn-1). She would like to replicate all the existing and future keys in V1 to a secondary region (e.g., us-phoenix-1) so that she can perform cryptographic operations using same key material across both regions.
  1. Alice would use an API to create a vault replica on V1 with us-phoenix-1 as replica region. KMS will eventually create a new Vault V2 of same type in us-phoenix-1 and replicate keys and all the associated metadata from V1 to V2.
  2. Until the replication is complete, Alice would view replica status for V2 as 'REPLICATING' in us-ashburn-1. After replication is fully complete, the replica status would switch to 'REPLICATED'.
  3. V2 and all the keys inside will eventually show up in us-phoenix-1 once replication is complete.
- B. Bob has Vault V1 in region us-ashburn-1 with a replica V2 in us-phoenix-1.
  1. Bob rotates a key in V1. The new rotated key will be available for use in us-ashburn-1 as soon as replication in that region is complete. Bob does not have to wait for replication to complete in us-phoenix-1.
  2. Once the key is replicated to us-phoenix-1, Bob can start using the key in us-phoenix-1. The replica status for that key will turn to 'REPLICATED' in us-ashburn-1 once it is available in us-phoenix-1.
- C. Matt has a Vault V1 in region us-ashburn-1 with a replica V2 in us-phoenix-1.
  1. Matt wants to replicate V1 to another region (e.g., uk-london-1) instead. He would call a delete vault replica operation (via the API) on V1 with replica region us-phoenix-1. The API will transmit a message indicating his request was accepted. KMS will eventually clean up V2 in us-phoenix-1.
  2. Once Matt does not see V2 via a get vault replica API call on V1, he proceed to perform scenario A with replica region as uk-london-1.
- D. Kaley has a Vault V1 in region us-ashburn-1 with a replica V2 in us-phoenix-1.
  1. Kaley deletes Vault V1. KMS would automatically clean up vault V2 i.e., Kaley would see V2 in us-phoenix go to status 'DELETING' and then to 'DELETED' eventually. In other words, by some embodiments, a deletion of the primary vault in the primary region leads to an automatic deletion of the secondary vaults.

Figure 2:
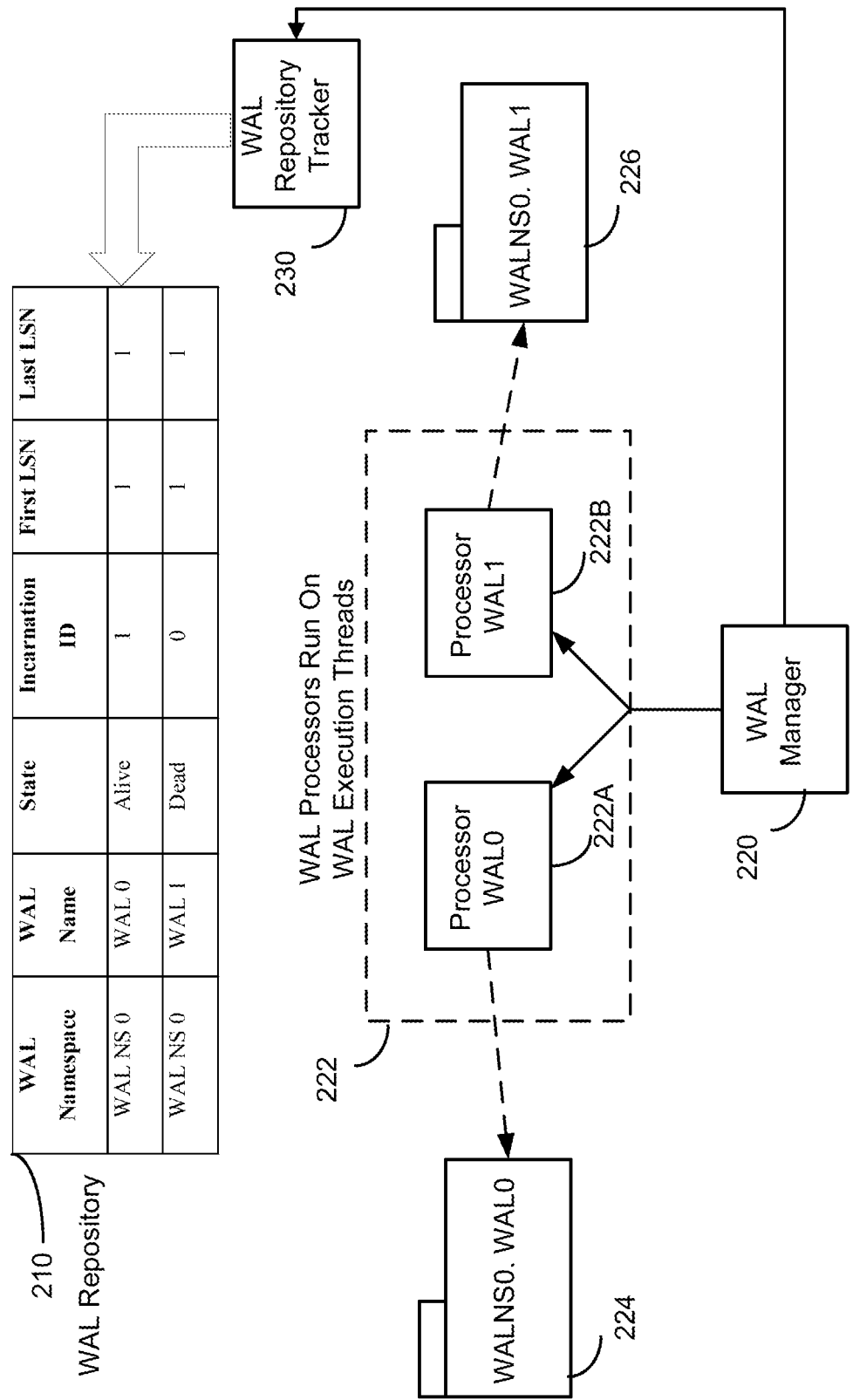
FIG. 2 depicts a schematic illustrating in-region replication of information according to some embodiments.

FIG. 2 depicts a schematic illustrating in-region replication of information according to some embodiments. Specifically, FIG. 2 represents replicating information from a key-value database (e.g., key-value database 107 of FIG. 1) to an HSM card (e.g., HSM card 110) and local databases (e.g., databases DB 113, and DB 115). As stated previously, the goal of maintaining data in the key-value database (i.e., backend database) is that it provides a highly available fault tolerant data store. However, the key-value database incurs a low throughput in terms of read and write operations. Thus, in order to circumvent the key-value database, for high throughput applications, data from the key-value database is mirrored (i.e., copied) locally to databases (DB) associated with the data plane micro-service (i.e., DB 113) and HSM micro-service (i.e., DB 115).

By one embodiment, a WAL (i.e., a ledger) is associated with a customer vault i.e., there is a one to one relationship between a WAL and a vault. A WAL repository e.g., WAL repository 210 manages creation and deletion of WALs within a WAL namespace. A WAL namespace encompasses all the WALs belonging to a state machine. For example, FIG. 2 depicts a WAL repository 210 maintained in a table format. Each row of the repository corresponds to a WAL. As shown in FIG. 2, the wall repository 210 includes two WALS labeled WAL0 and WAL1. The table also includes information pertaining to a state (i.e., alive or dead) for each WAL, an incarnation ID for each WAL, and information pertaining to a log sequence number associated with each WAL.

Each WAL included in the WAL repository 210 is associated with a unique WAL processor i.e., a node specific component that is responsible for the WAL on the node. For instance, as shown in FIG. 2, the replication system includes a plurality of processors 222. Specifically, a processor for WAL0, 222A is configured to reads entries from the corresponding WAL i.e., WAL0 224 and apply the entries to an underlying state machine e.g., HSM card. In a similar manner, processor for WAL1, 222B is configured to reads entries from the corresponding WAL i.e., WALL 226 and apply the entries to an underlying state machine. The in-region replication is executed in the HSM micro-service and data plane micro-service of a region. Specifically, the HSM micro-service applies the in-region replication to an HSM card, whereas the data plane micro-service applies the in-region replication to a local database (DB).

By some embodiments, a WAL manager 220 controls the plurality of processors 222. A WAL manager is defined herein as a node specific component that manages application of the WALs on individual nodes and listens for creation/deletion of WALs e.g., via a repository tracker 230. More specifically, the WAL manager 220 is an entry point for applying WALs and is an application (e.g., daemon) that constantly runs on every node per WAL namespace. The manager 220 may be instantiated at process start and its responsibility is to pull down a list of WALs in the WAL namespace and apply the log records. When the WAL manager 220 notices that a new WAL has been created, it creates a WAL processor (e.g., a processing thread) to apply changes associated with that WAL. The WAL manager 220 is also in charge of scheduling work to the individual WAL processors. This may be performed on a separate infrastructure thread that invokes a function call e.g., schedule( ) on all WAL processors. It is appreciated that WALs use monotonically increasing log sequence numbers (LSNs), and that WALs never have holes. i.e. a new record is added to LSN 'n' if and only if, the last record is at n−1 LSN. In this manner, the WAL manager 220 achieves in-region replication of information from the key-value database of a region to local DB s and HSM cards included in the region.

Figure 3A:
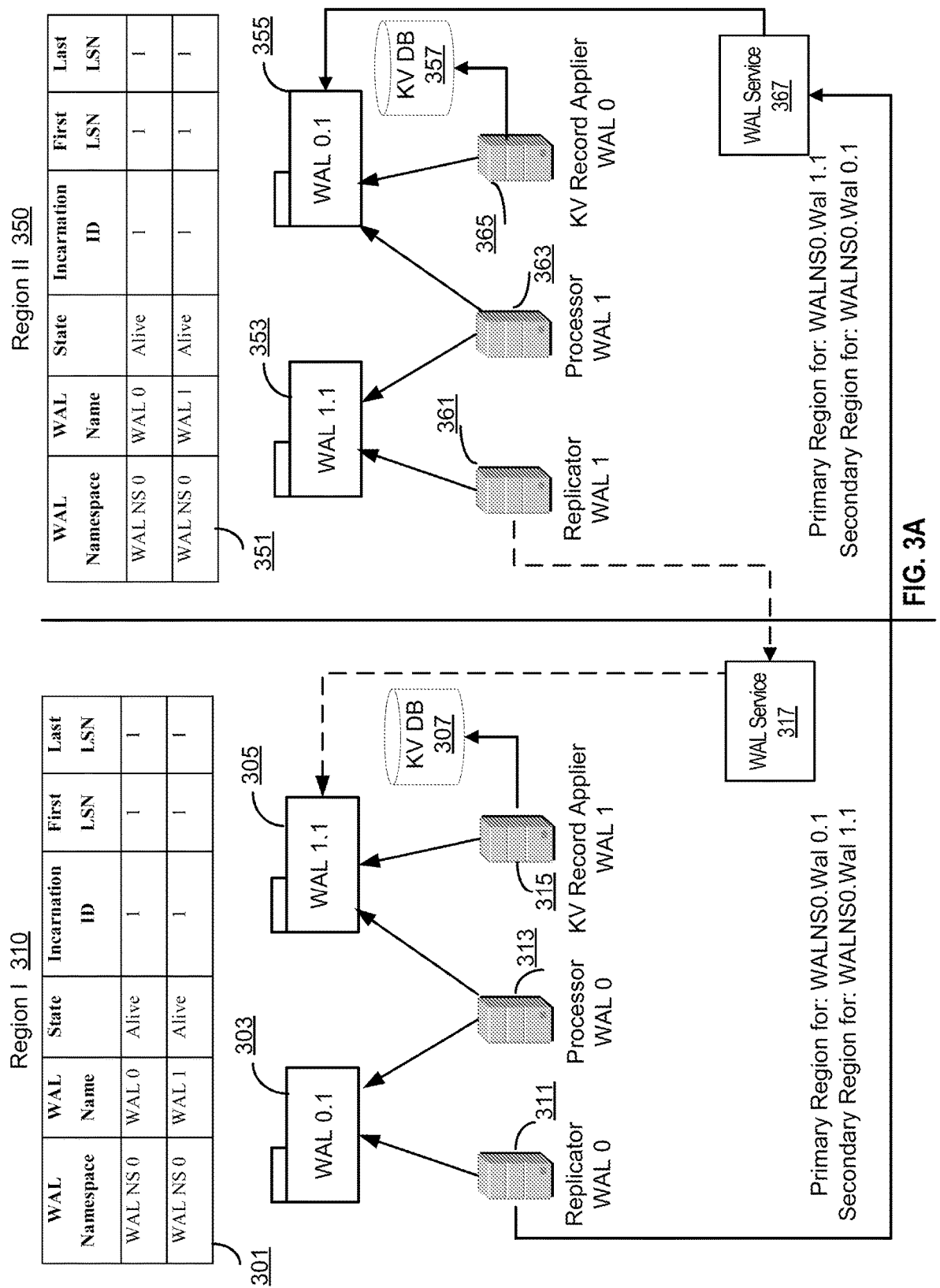
FIG. 3A depicts a schematic illustrating an exemplary cross-regional replication performed by a write-ahead log service in accordance with some embodiments.

FIG. 3A depicts a schematic illustrating an exemplary cross-regional replication performed by a write-ahead log service in accordance with some embodiments. Specifically, FIG. 3A depicts a first replication occurring from a primary region (e.g., region I 310) to a secondary region (e.g., region II 350), and a second replication occurring from region II 350 to region I 310. The first replication is depicted by solid lines, whereas the second replication is depicted by dotted lines. It is appreciated that a first customer may select region I 310 as being a primary region and choose to replicate a WAL e.g., the ledger labeled WAL 0.1 303, to the secondary region i.e., region II 350. Further, a second customer may customer may select region II 350 as being his primary region and choose to replicate a WAL e.g., the ledger labeled WAL 1.1 305, to region II 350. Note that the replication of WAL 0.1 303 occurs in a unidirectional manner from region I to region 2, whereas WAL 1.1 is replicated in a unidirectional manner from region II to region I. Each of regions I and II include a WAL repository e.g., repositories 301 and 351 respectively. Each WAL repository includes two WALS: i.e., WAL 0.1 and WAL 1.1. In what follows, there is described a mechanism of replicating WAL0.1 303 from region I 310 to region II 350.

As shown in FIG. 3A, to support cross-regional replication, the system may include the following components in each region: (1) a WAL Replicator, (2) a processor, and (3) a key-value (KV) record applier. In a region, a single instance of the replicator per WAL that is marked for cross-region replication will be tailing the WAL and append the records to WAL's counterpart in secondary region. For instance, for replicating WAL 0.1 303, the replicator 311 will relay records of the WAL 0.1 303 to the corresponding WAL service in region II (i.e., WAL service 367). The WAL service 367 in turn incorporates a copy of the WAL 0.1 within the repository 351 maintained in region II. In a similar manner, for WAL 1.1 (whose primary region is region II 350), the replicator 361 will relay records of the WAL 1.1 to the WAL service in region I (i.e., WAL service 317), which in turn incorporates a copy of the WAL 1.1 within the repository 301 maintained in region I. It is appreciated that each of the WAL services i.e., WAL service 317 and WAL service 367 is an internal service that exposes the WAL interface so that WAL replicators from other regions can write to and read about secondary WALs.

Each region may include a dedicated processor that is configured to process operations performed on each WAL. Furthermore, in each region, a single instance of a KV record applier (e.g., KV record applier 315, KV record applier 365) exists that tails the WAL and applies WAL records to key-value databases. For example, the KV record applier 315 applies records of WAL 1.1 (obtained from region II) to the key-value database 307, whereas the KV record applier 365 applies records of WAL 0.1 (obtained from region I) to the key-value database 357. It is appreciated that each region may include a controller (not shown in FIG. 3A), which comprises a plurality of schedulers. For instance, the controller may include a first scheduler (e.g., a WAL replicator scheduler) that schedules tasks for the replicator (e.g., replicator 311). Specifically, the WAL replicator scheduler may correspond to a thread that actively schedules work for WALs to replicate a batch of WAL records in a round robin fashion across all WALs. Similarly, the controller may include a second scheduler (e.g., a WAL application scheduler) that schedules tasks for each of the processors (dedicated per WAL) included in the region. Further, the controller may include a third type of scheduler (i.e., a KV application scheduler) that communicates with the KV record applier and schedules tasks to the KV record applier to apply records of WALs to the respective key-value databases.

According to some embodiments, cross-regional replication may occur via one of two types of information transmissions occurring from a primary region to a secondary region: (a) WAL records—capture every single mutation (ordered by log sequence numbers (LSNs)) performed on associated state machine, and (b) snapshots (i.e., replication performed in batches)—an image of the associated state machine at specific checkpoints (LSN). It is appreciated that the first type of information transmission results in a fully built state transmission machine. Such an information transmission process may be time-consuming. The second type of information transmission seeds a state machine from the latest image (i.e., a checkpoint), and then provides rest of the few mutations after that checkpoint.

Figure 3B:
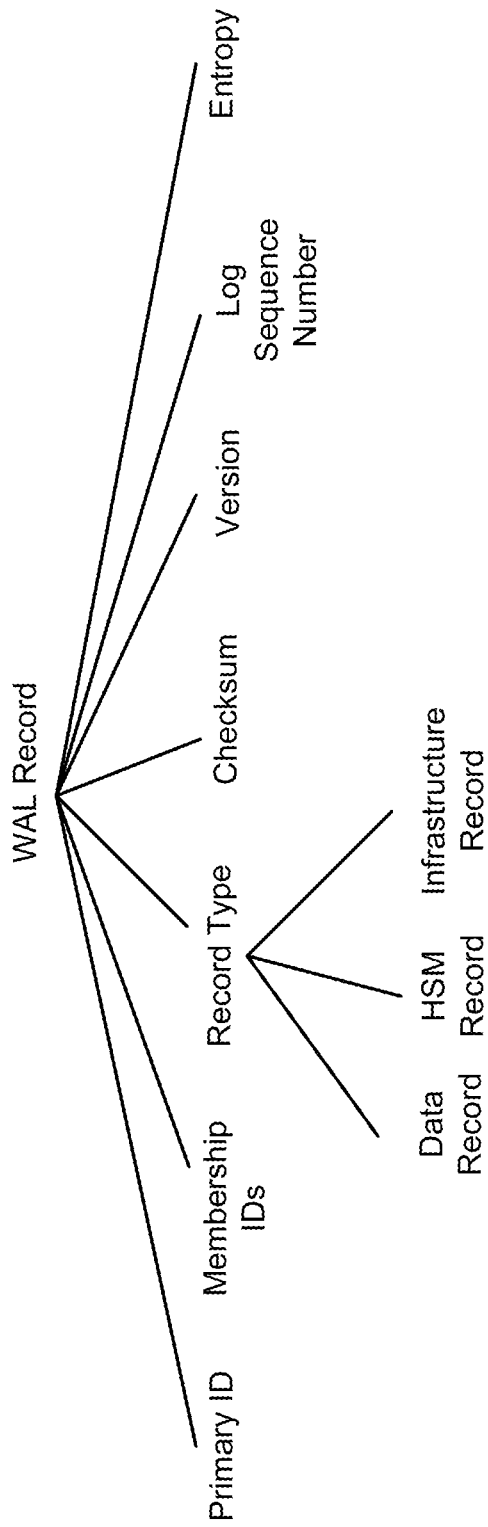
FIG. 3B depicts a schematic illustrating components of a write-ahead log record in accordance with some embodiments.

Turning to FIG. 3B, there is depicted a schematic illustrating components of a write-ahead log (WAL) record in accordance with some embodiments. Each record in the WAL includes at least the following components: (1) a primary ID corresponding to an identifier of a primary region of the WAL, (2) membership IDs corresponding to identifiers of secondary regions where the WAL is replicated, (3) a type of record of the WAL—such as a data type record, an HSM record, or an infrastructure type record (i.e., infrastructure commands such as obtaining a snapshot of the WAL), (4) a checksum value, (5) a version of the record, (6) a log sequence number of the record, and (7) an entropy value of the record.

By some embodiments, records are stored (in order) in a WAL, where each record is assigned a unique log sequence number i.e., the log sequence number is a monotonically increasing number that is assigned to each WAL record. A WAL replicator ensures inorder relaying of the records of the WAL from the primary region to the secondary region based on entropy values of each record. According to some embodiments, the entropy value of a record may be computed as a 32 bit cyclic redundancy code (CRC-32) as follows: CRC32 (previous record's entropy value, payload, LSN, membership, primary ID)→if LSN>1. Specifically, the entropy of a particular record (e.g., second record) is computed based on an entropy value of the record that immediately precedes the second record (e.g., the first record) in a plurality of records stored in the WAL. In certain implementations, the entropy value of a record (e.g., second record) can be computed based on at least the entropy value of a first record (i.e., immediate successor of the second record in the plurality of records) and the unique log sequence number of the second record.

By some embodiments, the entropy value of a record is an incremental checksum of each WAL entry. For instance, the entropy may be computed as a cyclic redundant code (CRC) of one or more parameters e.g., entropy=CRC32 (previous entropy, payload, LSN, membership, primary ID)→if LSN>1. The invariant provided by entropy is as follows: If entropy of WAL W1 at LSN 'n' matches with another WAL W2 at n, then W1 and W2 have same set of entries until LSN 'n'. This guarantees a log matching property. By one embodiment, entropy may be computed as Entropy (LSN n)=Checksum (Entropy (n−1), Checksum (entry n)) for n>0: Entropy (0)=0. Thus, in using a CRC of a previous entry to compute the CRC of a current entry, it is ensured that all WAL records in a WAL up to that point belong to that WAL.

Figure 4:
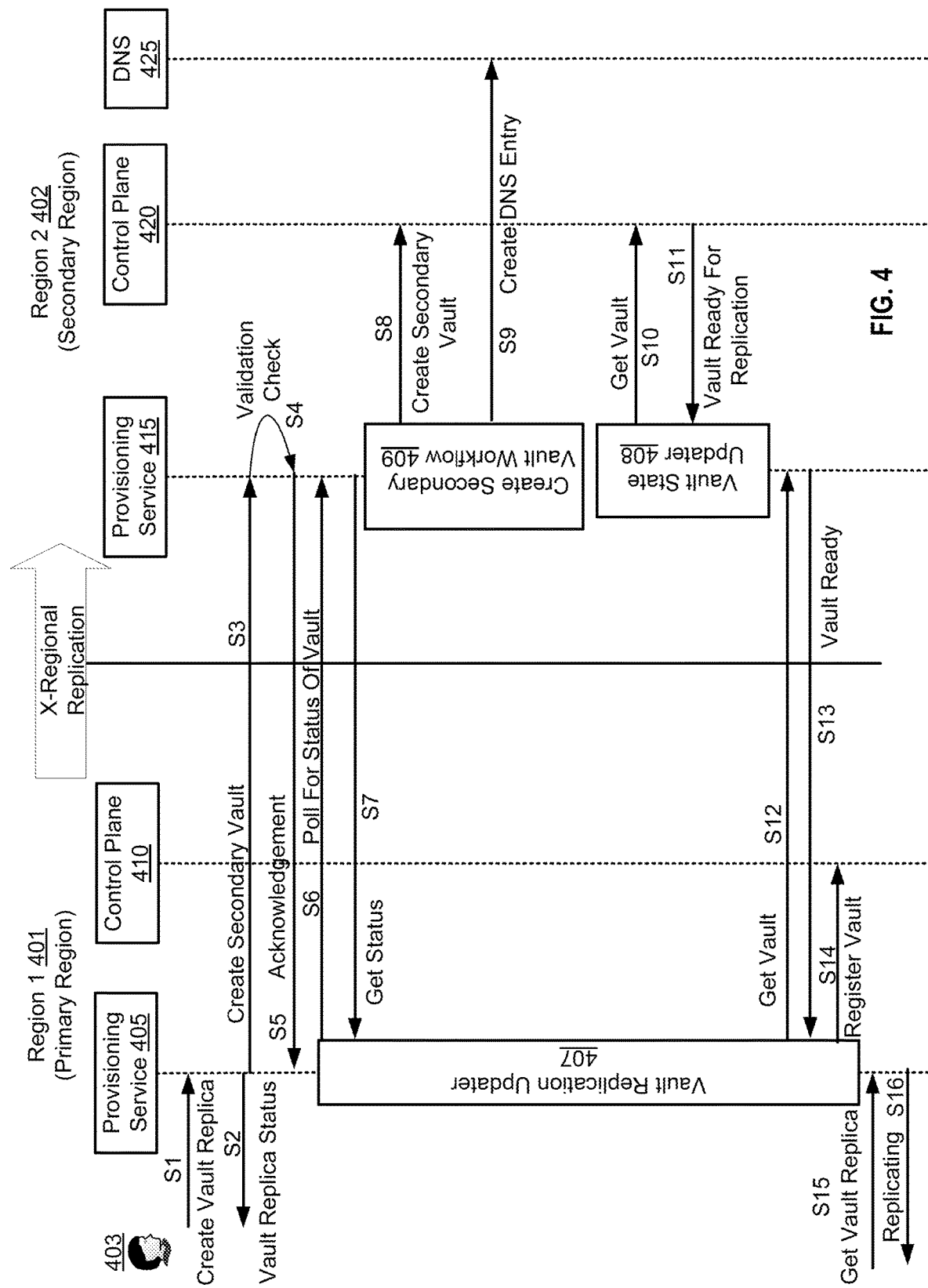
FIG. 4 depicts an exemplary flow diagram illustrating steps executed in constructing a vault replica in accordance with some embodiments.

FIG. 4 depicts an exemplary flow diagram illustrating steps executed in constructing a vault replica in accordance with some embodiments. When a user creates a new vault replica, an infrastructure is to be set up for user access to secondary vault and for the replication process to kick off. By some embodiments, the key management service of the present disclosure includes a provisioning service (PS) that fronts vault APIs. The provisioning service is responsible for DNS creation, limit checks, shard (e.g., database) placement for the vaults and providing customer facing vault information. As shown in FIG. 4, a primary region 401 includes a provisioning service 405 and a control plane 410, whereas a secondary region 402 includes the corresponding provisioning service 415 and the control plane 420. FIG. 4 illustrates communications between the primary region 401 and the secondary region 402, where it is assumed that the user 403 has a vault already created in the primary region 401, and desires for that vault to be replicated to the secondary region 402. In other words, in order to create the secondary vault in the secondary region 402, the provisioning service 405 in the primary region 401 communicates with its counterpart (i.e., provisioning service 415) in the secondary region to set up the secondary vault's infrastructure.

In step S1, the user 403 issues a request to create a vault in the secondary region to the provisioning service 405 in the primary region 401. The request may include an identifier of the second region 402. In step S2, the provisioning service 405 registers the user's request, and transmits an acknowledgement response to the user indicating that the process of creating the vault has commenced e.g., the provisioning service 405 may respond with an acknowledgement message indicating that the vault replication status is 'replicating'.

In step S3, the provisioning service 405 transmits a create secondary vault request to the provisioning service 415 included in the secondary region. In step S4, the provisioning service 415 included in the secondary region performs one or more validation checks e.g., determine resource availability, verify if the particular user 403 is permitted to create a vault in the secondary region, etc. Upon successfully validating the one or more checks, the provisioning service 415 included in the secondary region 402 transmits an acknowledgement message back to the provisioning service 405 included in the primary region 401 (step S5).

Upon receiving the acknowledgement message from the provisioning service 415 of the secondary region 402, the provisioning service 405 of the primary region 401 may poll the provisioning service of the secondary as to the status of the vault creation in step S6. It is appreciated that the provisioning service 405 of the primary region may utilize a vault replication updater 407 (e.g., a processing thread) to continuously poll the provisioning service 415 of the secondary region. In response. The provisioning service 415 of the secondary region may respond with an acknowledgement message indicating that the vault replication status is in progress (step S7).

In step S8, the provisioning service 415 of the secondary region 402 creates a workflow request that is transmitted to the control plane 420 of the secondary region. By some embodiments, the provisioning service 415 may utilize the create secondary vault workflow module (e.g., a processing thread) 409 to initiate the workflow request. The workflow may include instructions for constructing tables to store the WALs. Additionally, the provisioning service 415 included in the secondary region 402 also transmits a request to the cloud infrastructure domain name system (DNS) 425 to create a DNS entry to be associated with the vault (step S9).

In step S10, a vault status updater 408 included in the provisioning service 415 of the secondary region 402 may poll the control plane 420 of the secondary region to get an updated status of the vault creation process. Upon receiving an acknowledgement indicating successful completion of the vault creating process from the control plane of the secondary region (step S11), the provisioning service 415 of the secondary region 402 may indicate the same (i.e., vault ready message in step S13) to the provisioning service 405 of the primary region 401 in response to receiving a get vault message (step S12) from the provisioning service 405.

Upon receiving an indication that the vault is ready for replication, in step S14, the provisioning service 405 of the primary region 401 may register the vault with the control plane 410 of the primary region. The provisioning service included in the primary region may thereafter receive a follow-up request from the user pertaining to whether the vault has been established (step S15). In response to receiving the follow-up request from the user 403, in step S16, the provisioning service 405 included in the primary region 401 may respond with a message indicating a 'Replicated' status implying that the vault in the secondary region has been created and that the WAL in the primary region can be replicated to the vault in the secondary region.

According to some embodiments, KMS replicates keys in a vault within and across regions in a realm. Customer or user mutations on their respective vaults and keys are driven by write-ahead-logs (WALs) internally, and WALs are replicated across regions to achieve cross regional replication of customer keys. The replication model of the present disclosure constitutes a single primary region that allows read and write operations on the WAL. The replicated regions (also interchangeably called secondary regions) allow read operations on the WAL. Superficially mutation operations are not permitted on WALs replicated in the secondary region. When a primary region goes down i.e., a failure event, customers can no longer access resources in the primary region. In such cases, one of the secondary regions is automatically nominated to serve as the primary region of the user. Additionally, it is appreciated that a delete operation performed on the vault in the primary region leads to an automatic deletion of vaults in the one or more secondary regions.

Figure 5:
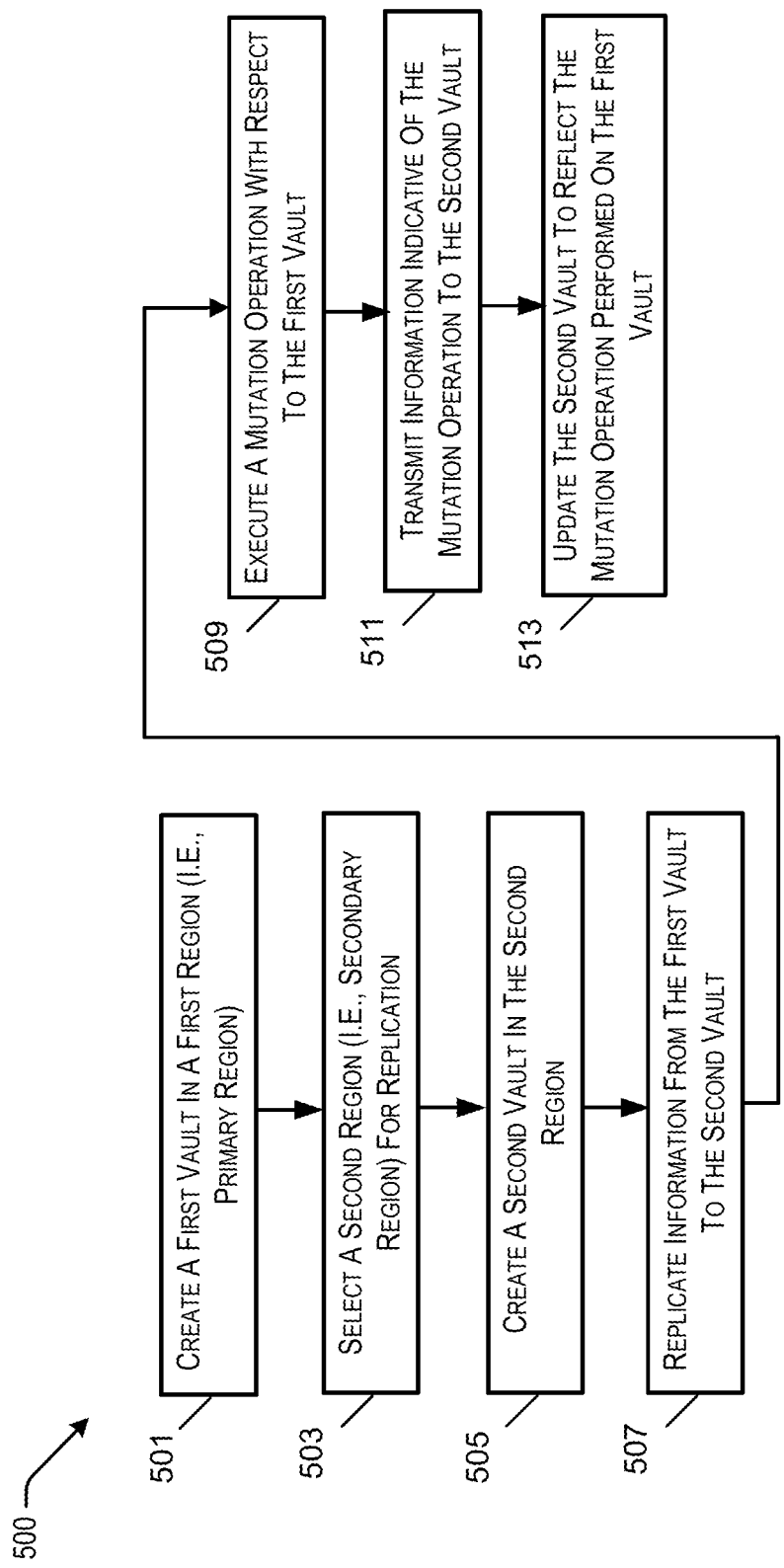
FIG. 5 depicts an exemplary flowchart illustrating a process performed by a computing device in replicating information, in accordance with various embodiments.

FIG. 5 depicts a flowchart 500 illustrating a process performed by a computing device in replicating information, in accordance with various embodiments. For instance, the computing device may include a WAL service (e.g., WAL service 111 of FIG. 1) that is utilized to perform the replication. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

The process commences in step 501 where a first vault is created in a first region of the cloud infrastructure. The first region corresponds to a primary region. It is appreciated that the first vault created in the first region can be managed by a plurality of micro-services such as control plane micro-service 103, data plane micro-service 105, HSM micro-service 109, and the WAL service 111 of FIG. 1. In step 503, the user selects a second region within the cloud infrastructure where replication of the first vault is desired. By some embodiments, the second region is different than the first region and may correspond to another region (i.e., a non-overlapping region with respect to the first region) within a realm of the cloud infrastructure.

In step 505, a secondary vault is created in the selected second region. The process of creating the secondary vault corresponds to an infrastructure that is set up for user access to secondary vault and for the replication process to kick off as described previously with reference to FIG. 4. Upon creation of the secondary vault in the second region of the cloud infrastructure, information is replicated from the first vault in the first region to the second vault in the second region for replication purposes. It is appreciated that information replication corresponds to the in order transmission of the individual records of the WAL such that the records are duplicated and stored in the secondary vault of the second region.

The process then proceeds to step 509, where a mutation operation is executed with respect to the first vault. It is noted that mutation operation may correspond to one of: changing the metadata associated with the key, performing a rotation operation of the key, or updating a display name of the first vault. By some embodiments, the mutation operation may be stored as a new record in the WAL of in the first vault. The process thereafter proceeds to step 511, where information indicative of the mutation operation is transmitted to the second vault. For instance, the new record can be transmitted to the WAL service in the secondary region for replication. In step 513, the second vault is updated to reflect the mutation operation performed on the first vault. For instance, the WAL service in the secondary region replicates and stores the new record in the secondary vault thereby ensuring that the mutation operation is successfully mirrored in the second vault. In the above steps of replication, it is appreciated that the replication of the individual records of a WAL are performed in order based on the entropy value of the record. By utilizing entropy value (i.e., computed based on the entropy value of an immediately succeeding record, log sequence number of the current record, etc.) the replication process ensures that a log matching property is satisfies. In other words, if entropy of WAL W1 at LSN 'n' matches with another WAL W2 at n, then the WALS W1 and W2 have same set of entries until LSN 'n'.

Figure 6:
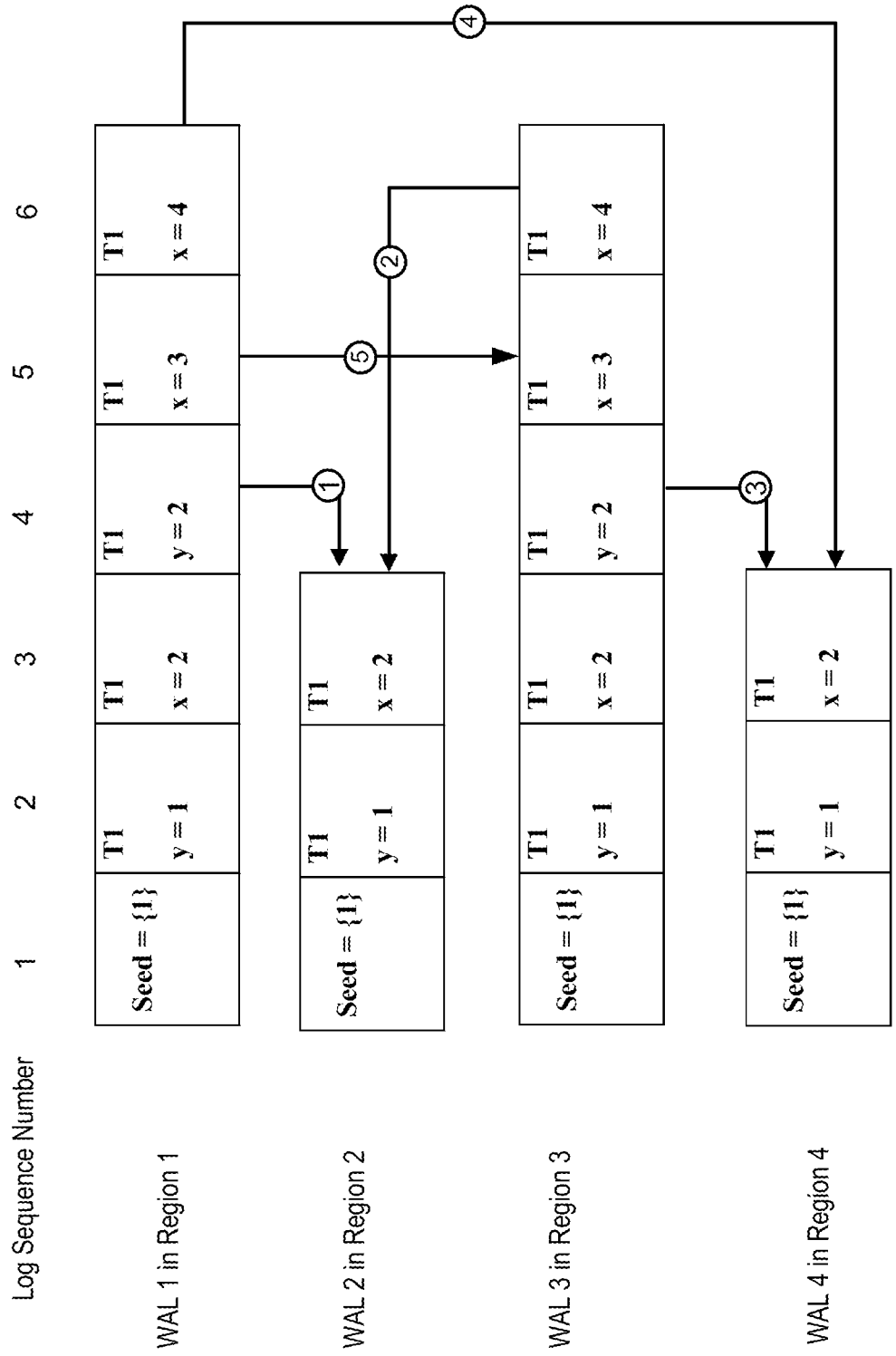
FIG. 6 depicts a schematic illustrating exemplary replications in accordance with some embodiments.

FIG. 6 depicts illustrates exemplary replications in accordance with some embodiments. FIG. 6 depicts four WALS maintained in region 1, region 2, region 3, and region 4, respectively. Each WAL has a first entry/record including a seed value, which indicates the primary region ID of the WALs. As shown in FIG. 6, the primary region of the WALs is region 1 (i.e., seed value of '1'). Further, a current state of the WALS is as follows: WAL 1 in region 1 includes six entries, WAL 2 in region 2 includes three entries, WAL 3 in region 3 includes six entries, whereas WAL 4 in region 4 includes four entries.

In operation 1, WAL 1 in region 1 attempts to replicate entry 4 to WAL 2 in region 2. This operation is deemed valid as entry 4 has a membership value of 2 (i.e., y={2}), thereby indicating that replication to region 2 is permitted. Moreover, the entropy is valid, as the last copy in WAL 2 of region 2 is entry 3. In operation 2, region 3 attempts to replicate entry 6 to region 2. This operation is deemed invalid due to an incorrect entropy value i.e., bad log sequence number and membership ID. In operation 3, region 3 attempts to replicate entry 4 to region 4. This operation is also deemed invalid due to an incorrect entropy value i.e., bad membership ID. In operation 4, region 1 attempts to replicate entry 6 to region 4. This operation is deemed invalid due to an incorrect entropy value i.e., bad log sequence number. Further, in operation 5, region 1 attempts to replicate entry 5 to region 3. Note that this operation is deemed valid due to correct entropy value. In this manner, replication of WAL records occurs in a uni-directional manner i.e., from primary region of the WAL to one or more secondary regions. Any operations (e.g., mutation operations) performed on the WAL in the primary region are relayed to the one or more WALS in the secondary region(s).

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
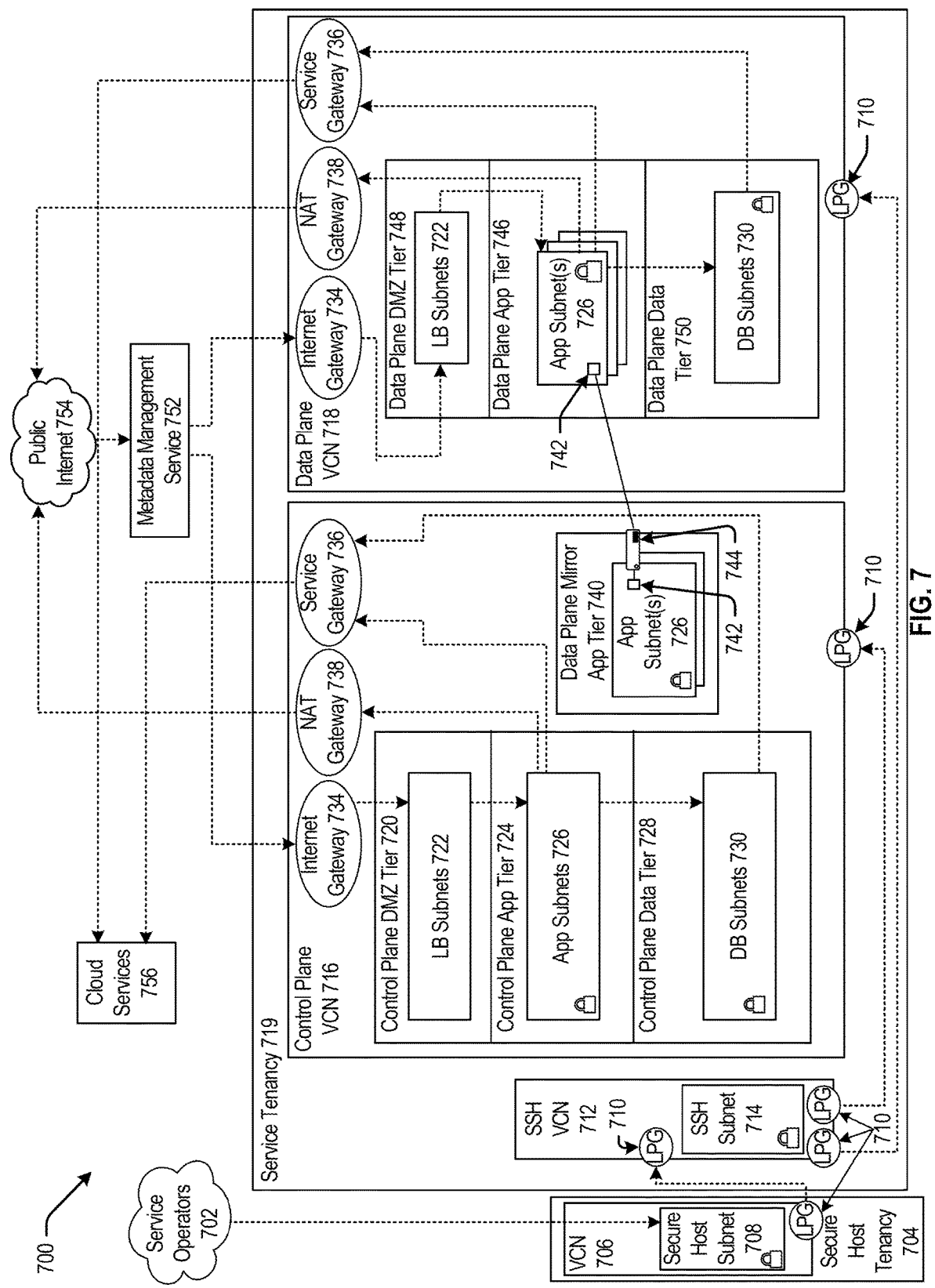
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
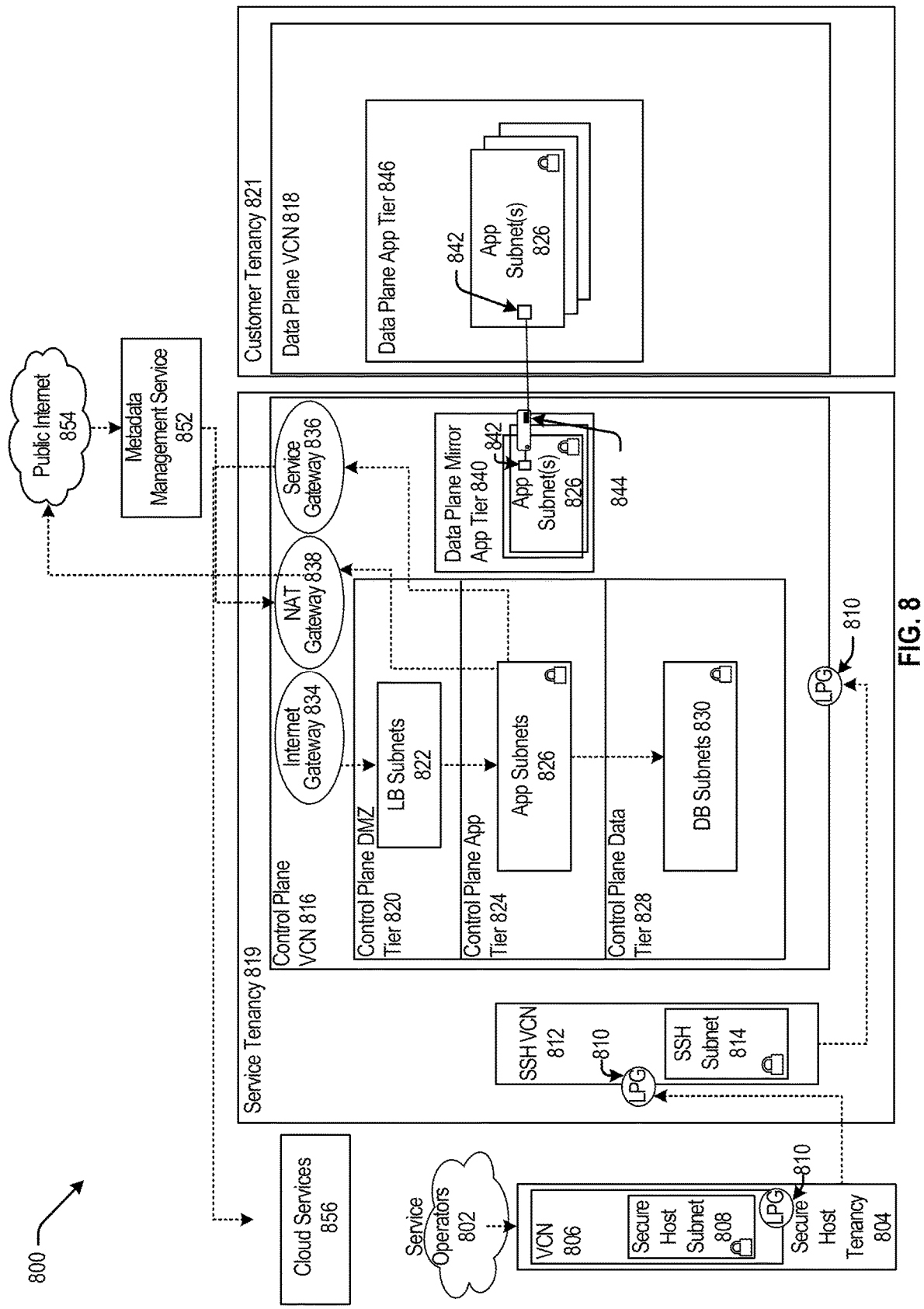
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 6," may be located in Region 1 and in "Region 2." If a call to Deployment 6 is made by the service gateway 836 contained in the control plane VCN 816 located in Region 1, the call may be transmitted to Deployment 6 in Region 1. In this example, the control plane VCN 816, or Deployment 6 in Region 1, may not be communicatively coupled to, or otherwise in communication with, Deployment 6 in Region 2.

Figure 9:
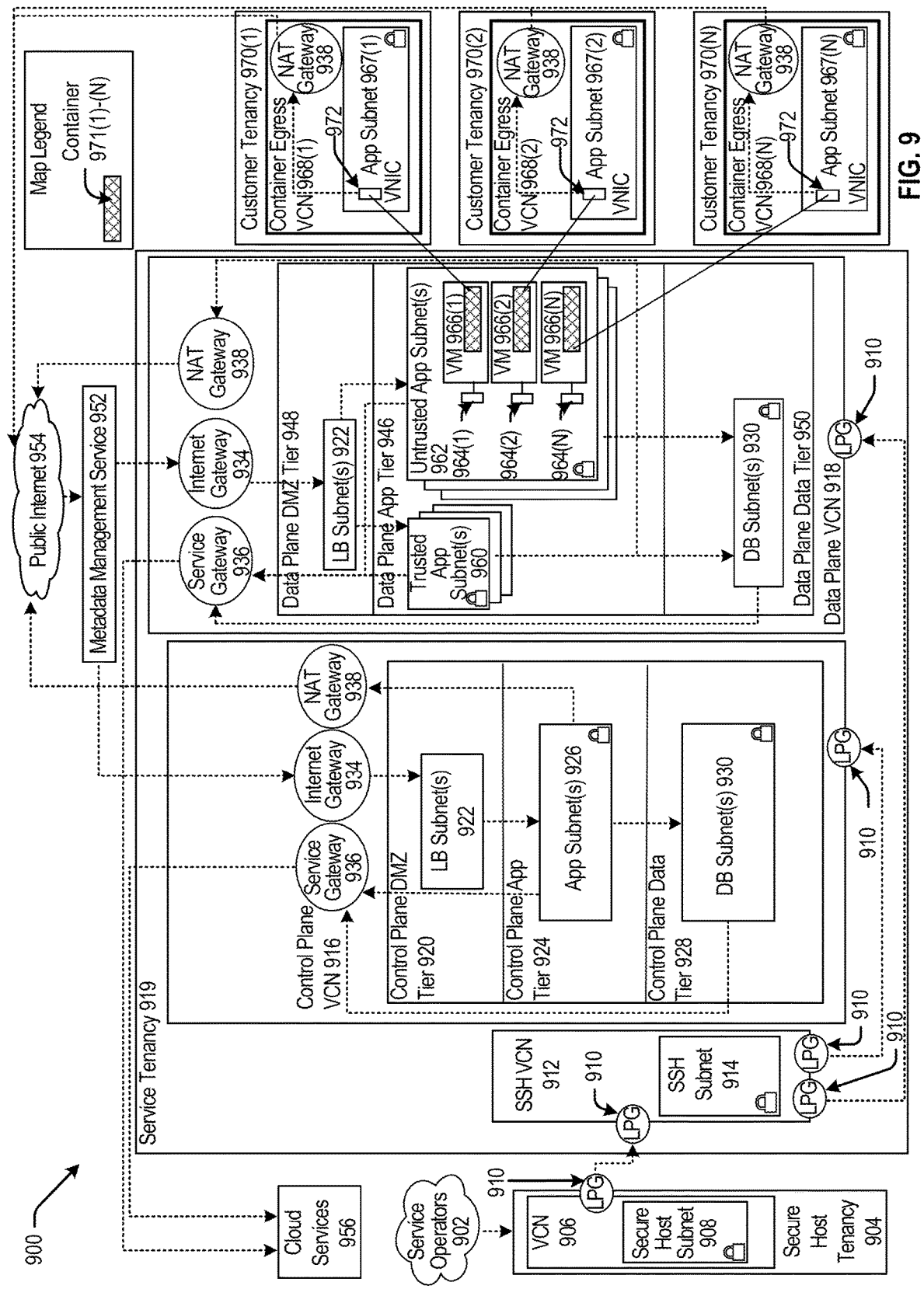
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
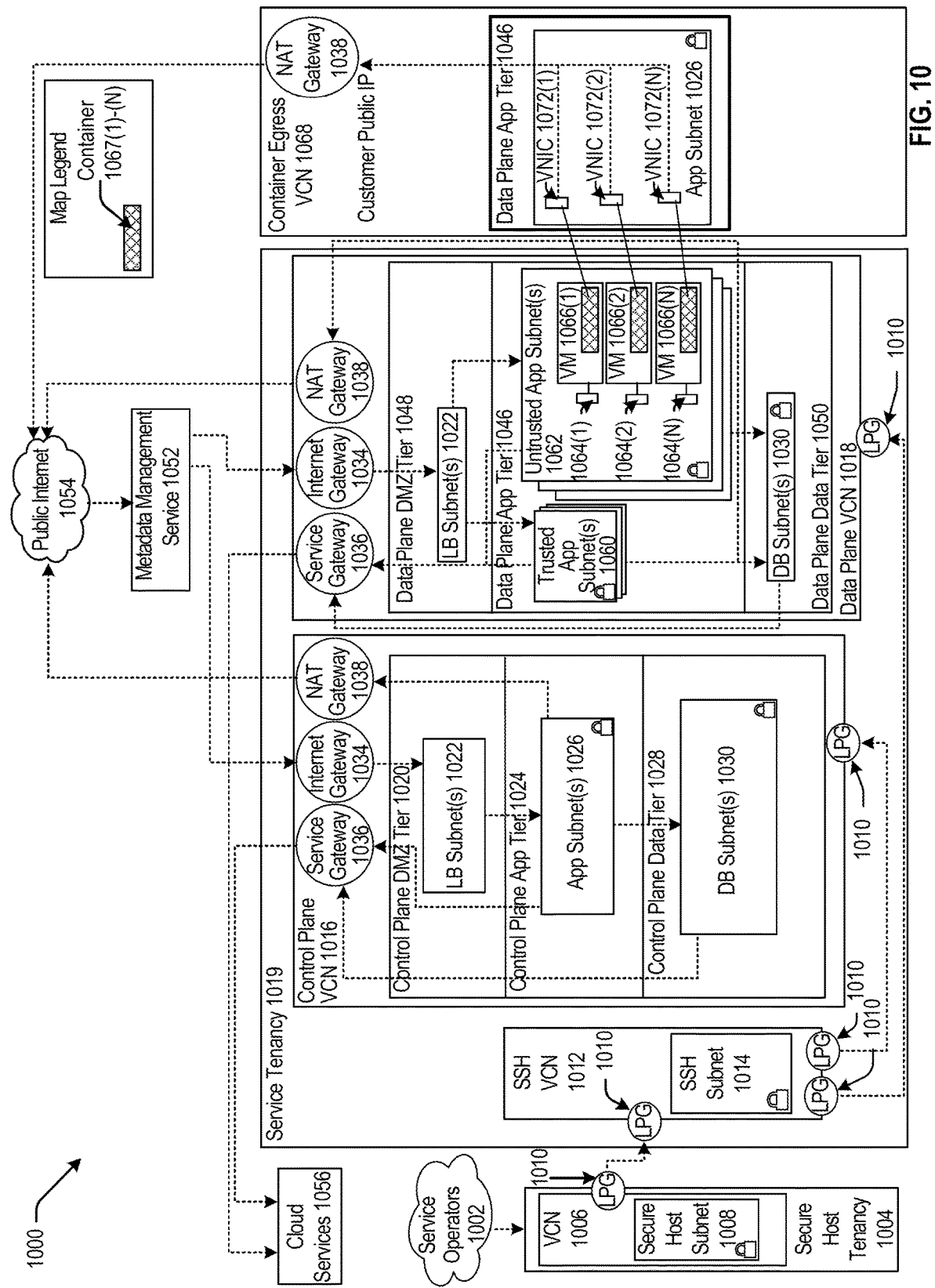
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
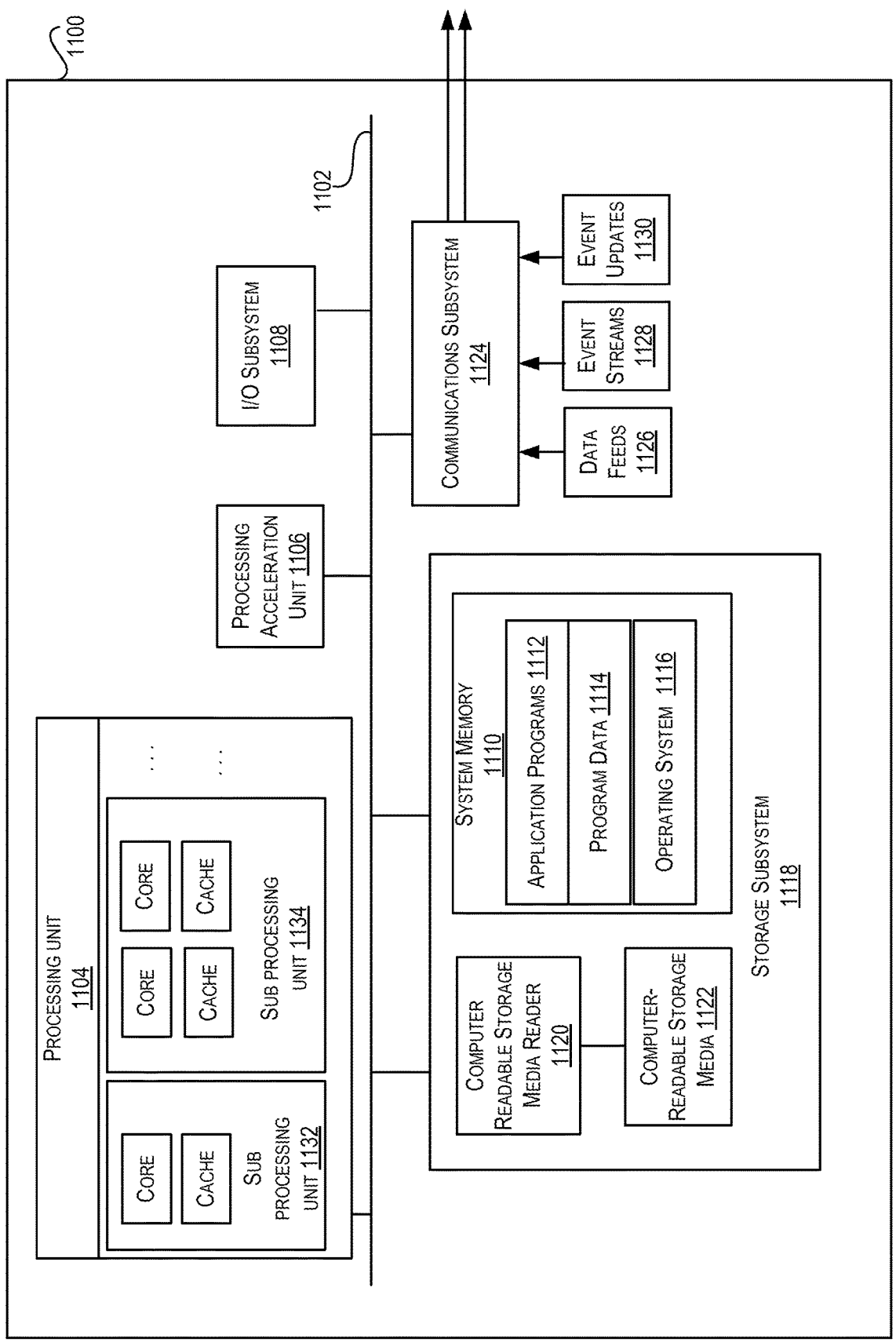
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1000 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1002.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more non-transitory computer readable media comprising instructions which, when executed by one or more hardware processors, causes performance of operations comprising:
   detecting a first mutation operation with respect to a first set of records stored in a first vault;
   generating information indicative of the first mutation operation;
   generating a first incremental checksum based on a first state associated with the first vault, wherein the first state is determined prior to execution of the first mutation operation,
   causing replication of the first mutation operation at least by: transmitting to a ledger service associated with a second vault, the information indicative of the first mutation operation and the first incremental checksum;
   wherein the ledger service replicates the first mutation operation as a second mutation operation for application to a second set of records stored in the second vault;
   wherein the second set of records is identical to the first set of records prior to the first mutation operation,
   wherein the ledger service determines that the first incremental checksum matches a second incremental checksum,
   wherein the second incremental checksum is based on a second state associated with the second vault,
   wherein the second state is determined prior to execution of the second mutation operation, and
   wherein the ledger service performs the second mutation operation with respect to the second set of records responsive to determining that the first incremental checksum matches the second incremental checksum.

2. The media of claim 1, wherein the first state associated with the first vault comprises a state of the first set of records in the first vault prior to execution of the first mutation operation.

3. The media of claim 1, wherein the first state associated with the first vault comprises a state of a mutation log prior to entry of the first mutation operation in the mutation log.

4. The media of claim 1, wherein the operations further comprise:
   receiving a mutation call from the ledger service;
   responsive to the mutation call, performing a third mutation operation with respect to the first set of records stored in the first vault;
   causing replication of the third mutation operation as a fourth mutation operation to the second set of records stored in the second vault.

5. The media of claim 4, wherein the mutation call is a proxy of a mutation request with respect to the second vault.

6. The media of claim 5, wherein a set of mutation operations, including the third mutation operation and the fourth mutation operation, are replicated unidirectionally from the first set of records to the second set of records.

7. The media of claim 1, wherein the operations further comprise:
   detecting a third mutation operation with respect to the first set of records stored in the first vault;
   computing a third incremental checksum based on the first incremental checksum;
   causing replication of the third mutation operation as a fourth mutation operation to the second set of records stored in the second vault at least by transmitting to the ledger service associated with the second vault, information indicative of the third mutation operation and the third incremental checksum, wherein the ledger service performs the fourth mutation operation with respect to the second set of records.

8. The media of claim 7, wherein the ledger service determines a sequence for performing the second mutation operation and the fourth mutation operation based on the first incremental checksum and the third incremental checksum, wherein the fourth mutation operation is performed by the ledger service subsequent to the second mutation operation.

9. The media of claim 7, wherein the operations further comprise:
generating a first log entry comprising the information indicative of the first mutation operation and the first incremental checksum;
generating a second log entry comprising information indicative of the third mutation operation and the third incremental checksum, wherein the third incremental checksum is computed based on at least a portion of the first log entry;
wherein transmitting information indicative of the third mutation operation to the ledger service comprises transmitting the second log entry to the ledger service.

10. The media of claim 9,
wherein the first log entry comprises a first log sequence number,
wherein the first log sequence number identifies a first position of the first log entry in a sequential set of log entries, and
wherein the third incremental checksum is computed based on the first incremental checksum and the first log sequence number.

11. The media of claim 1, wherein the first state is represented by a first log entry, and wherein the first incremental checksum is computed based on one or more parameters of the first log entry.

12. The media of claim 1, wherein the first incremental checksum comprises a first entropy value computed based on the first state.

13. The media of claim 1, wherein the first incremental checksum comprises a cyclic redundant code value computed based on the first state.

14. The media of claim 1,
wherein the first vault is utilized as a primary database with respect to at least one operation of a cloud infrastructure, and
wherein the second vault is utilized as a backup database with respect to the at least one operation of the cloud infrastructure.

15. The media of claim 14,
wherein the first vault is located in a first region of the cloud infrastructure, and
wherein the second vault is located in a second region of the cloud infrastructure.

16. The media of claim 1,
wherein the first vault comprises a key value table,
wherein the key value table comprises the first set of records,
wherein each particular record, of the first set of records, comprises a particular encryption key, and
wherein the particular encryption key is unique with respect to each additional record of the first set of records.

17. The media of claim 1,
wherein the first set of records comprises a plurality of encryption keys,
wherein the first mutation operation comprises at least one of:
modifying a first key of the plurality of encryption keys, adding a second key to the plurality of encryption keys, or removing a third key from the plurality of encryption keys.

18. A method, comprising:
detecting a first mutation operation with respect to a first set of records stored in a first vault;
generating information indicative of the first mutation operation;
generating a first incremental checksum based on a first state associated with the first vault, wherein the first state is determined prior to execution of the first mutation operation,
causing replication of the first mutation operation at least by: transmitting to a ledger service associated with a second vault, the information indicative of the first mutation operation and the first incremental checksum;
wherein the ledger service replicates the first mutation operation as a second mutation operation for application to a second set of records stored in a second vault;
wherein the second set of records is identical to the first set of records prior to the first mutation operation,
wherein the ledger service determines that the first incremental checksum matches a second incremental checksum,
wherein the second incremental checksum is based on a second state associated with the second vault,
wherein the second state is determined prior to execution of the second mutation operation, and
wherein the ledger service performs the second mutation operation with respect to the second set of records responsive to determining that the first incremental checksum matches the second incremental checksum;
wherein the method is performed by at least one device including a hardware processor.

19. The method of claim 18, wherein the first state associated with the first vault comprises a state of the first set of records in the first vault prior to execution of the first mutation operation.

20. The method of claim 18, wherein the first state associated with the first vault comprises a state of a mutation log prior to entry of the first mutation operation in the mutation log.

21. The method of claim 18, further comprising:
receiving a mutation call from the ledger service;
responsive to the mutation call, performing a third mutation operation with respect to the first set of records stored in the first vault;
replicating the third mutation operation as a fourth mutation operation to the second set of records stored in the second vault.

22. The method of claim 21, wherein the mutation call is a proxy of a mutation request with respect to the second vault, and wherein a set of mutation operations, including the third mutation operation and the fourth mutation operation, are replicated unidirectionally from the first set of records to the second set of records.

23. The method of claim 18, further comprising:
detecting a third mutation operation with respect to the first set of records stored in the first vault;
computing a third incremental checksum based on the first incremental checksum;
replicating the third mutation operation as a fourth mutation operation to the second set of records stored in the second vault at least by transmitting to the ledger service associated with the second vault, information indicative of the third mutation operation and the third incremental checksum, wherein the ledger service performs the fourth mutation operation with respect to the second set of records.

24. The method of claim 23, wherein the ledger service determines a sequence for performing the second mutation operation and the fourth mutation operation based on the first incremental checksum and the third incremental checksum, wherein the fourth mutation operation is performed by the ledger service subsequent to the second mutation operation.

25. The method of claim 23, further comprising:
generating a first log entry comprising the information indicative of the first mutation operation and the first incremental checksum;
generating a second log entry comprising information indicative of the third mutation operation and the third incremental checksum, wherein the third incremental checksum is computed based on at least a portion of the first log entry;
wherein transmitting information indicative of the third mutation operation to the ledger service comprises transmitting the second log entry to the ledger service.

26. The method of claim 25,
wherein the first log entry comprises a first log sequence number,
wherein the first log sequence number identifies a first position of the first log entry in a sequential set of log entries, and
wherein the third incremental checksum is computed based on the first incremental checksum and the first log sequence number.

27. The method of claim 18, wherein the first state is represented by a first log entry, and wherein the first incremental checksum is computed based on one or more parameters of the first log entry.

28. The method of claim 18, wherein the first incremental checksum comprises a first entropy value computed based on the first state.

29. The method of claim 18, wherein the first incremental checksum comprises a cyclic redundant code value computed based on the first state.

30. The method of claim 18,
wherein the first vault is utilized as a primary database with respect to at least one operation of a cloud infrastructure, and
wherein the second vault is utilized as a backup database with respect to the at least one operation of the cloud infrastructure.

31. The method of claim 30,
wherein the first vault is located in a first region of the cloud infrastructure, and
wherein the second vault is located in a second region of the cloud infrastructure.

32. The method of claim 18,
wherein the first vault comprises a key value table,
wherein the key value table comprises the first set of records,
wherein each particular record, of the first set of records, comprises a particular encryption key, and
wherein the particular encryption key is unique with respect to each additional record of the first set of records.

33. The method of claim 18,
wherein the first set of records comprises a plurality of encryption keys,
wherein the first mutation operation comprises at least one of:
modifying a first key of the plurality of encryption keys, adding a second key to the plurality of encryption keys, or removing a third key from the plurality of encryption keys.

34. A system comprising:
at least one hardware processor;
the system being configured to execute operations, using the at least one hardware processor, the operations comprising:
detecting a first mutation operation with respect to a first set of records stored in a first vault;
generating information indicative of the first mutation operation;
generating a first incremental checksum based on a first state associated with the first vault, wherein the first state is determined prior to execution of the first mutation operation,
causing replication of the first mutation operation at least by: transmitting to a ledger service associated with a second vault, the information indicative of the first mutation operation and the first incremental checksum;
wherein the ledger service replicates the first mutation operation as a second mutation operation for application to a second set of records stored in the second vault;
wherein the second set of records is identical to the first set of records prior to the first mutation operation,
wherein the ledger service determines that the first incremental checksum matches a second incremental checksum,
wherein the second incremental checksum is based on a second state associated with the second vault,
wherein the second state is determined prior to execution of the second mutation operation, and
wherein the ledger service performs the second mutation operation with respect to the second set of records responsive to determining that the first incremental checksum matches the second incremental checksum.

* * * * *

UNITED STATES PATENT AND TRADEMARK OFFICE
CERTIFICATE OF CORRECTION

PATENT NO. : 12,126,604 B2
APPLICATION NO. : 18/472790
DATED : October 22, 2024
INVENTOR(S) : Balasubramanian et al.

It is certified that error appears in the above-identified patent and that said Letters Patent is hereby corrected as shown below:

In the Specification

In Column 8, Line 46, delete "WALL" and insert -- WAL1 --, therefor.

In Column 9, Line 9, delete "DB s" and insert -- DBs --, therefor.

In Column 10, Line 44, delete "inorder" and insert -- in order --, therefor.

In Column 12, Line 40, delete "Superficially" and insert -- Specifically --, therefor.

In Column 25, Line 41, delete "Ski®" and insert -- Siri® --, therefor.

Signed and Sealed this
Fourth Day of February, 2025

Coke Morgan Stewart
*Acting Director of the United States Patent and Trademark Office*